US008317972B2

(12) United States Patent
Dunwoody et al.

(10) Patent No.: US 8,317,972 B2
(45) Date of Patent: Nov. 27, 2012

(54) METHOD AND APPARATUS FOR OPTICAL FIBER COATING REMOVAL

(75) Inventors: Steven Akin Dunwoody, Castle Hayne, NC (US); Oscar Palmer, Leland, NC (US)

(73) Assignee: Corning Incorporated, Corning, NY (US)

( * ) Notice: Subject to any disclaimer, the term of this patent is extended or adjusted under 35 U.S.C. 154(b) by 1044 days.

(21) Appl. No.: 11/983,023

(22) Filed: Nov. 6, 2007

(65) Prior Publication Data

US 2008/0128084 A1    Jun. 5, 2008

Related U.S. Application Data

(60) Provisional application No. 60/861,921, filed on Nov. 30, 2006.

(51) Int. Cl.
*B32B 38/10* (2006.01)

(52) U.S. Cl. ........ 156/708; 156/711; 156/752; 156/757; 156/923

(58) Field of Classification Search ............. 156/344, 156/584, 708, 711, 752, 757, 923
See application file for complete search history.

(56) References Cited

U.S. PATENT DOCUMENTS

| 4,203,650 | A | * | 5/1980 | Millet et al. | 385/54 |
| 4,969,703 | A | * | 11/1990 | Fyfe et al. | 385/123 |
| 5,298,105 | A | * | 3/1994 | Dorsey | 156/584 |
| 5,306,378 | A | * | 4/1994 | Takimoto et al. | 156/344 |
| 5,479,701 | A | * | 1/1996 | Yamano et al. | 29/825 |
| 5,553,181 | A | * | 9/1996 | van Woesik | 385/85 |
| 5,896,787 | A | * | 4/1999 | DeVincentis | 81/9.51 |
| 5,948,202 | A | | 9/1999 | Miller | 156/344 |
| 6,123,801 | A | | 9/2000 | Miller | 156/344 |
| 2002/0148559 | A1 | * | 10/2002 | Beffroy et al. | 156/344 |
| 2007/0172191 | A1 | * | 7/2007 | Song | 385/134 |

FOREIGN PATENT DOCUMENTS

WO    WO 2005078491 A1 *  8/2005

* cited by examiner

*Primary Examiner* — Mark A Osele

(74) *Attorney, Agent, or Firm* — Svetlana Z. Short

(57) ABSTRACT

A method for removing a protective coating material from a portion of an optical fiber including a glass optical fiber having an outer surface surrounded by said protective coating material, said method comprising the steps of: (i) providing a fiber collection and support device having: (a) a coarse conical fiber collector having an input port and (b) a fine fiber centering collector including a fiber tube having an output port, said input port is larger then said output port; (ii) providing the fiber threaded through the course conical collector into the fiber collection tube of the fine fiber centering collector; (iii) contacting the fiber, as it exits from the output port of the fiber collection tube of the fiber collection and support device, with a stream of hot gas; and (iv) directing a stream of a hot gas onto the protective coating material that is to be removed.

13 Claims, 9 Drawing Sheets

Hot Gas Stripper Jet "Hot Zone" Characterization
Stainless Sheath Only 15 mm/sec Strip Speed
Rating >=4 Procedures Acceptable Performances Hot Gas Stripper Jet "Hot Zone" Characterization
Stainless Sheath Only 15 mm/sec Strip Speed
Rating >=4 Procedures Acceptable Performances Hot Gas Stripper Jet "Hot Zone" Characterization
Stainless Sheath w/ Insulation 12 mm/sec Strip Speed
Rating >=4 Procedures Acceptable Performances Hot Gas Stripper Jet "Hot Zone" Characterization
Stainless Sheath w/ Insulation 10 mm/sec Strip Speed
Rating >=4 Procedures Acceptable Performances

METHOD AND APPARATUS FOR OPTICAL FIBER COATING REMOVAL

This application claims the benefit of U.S. Provisional Application No. 60/861,921, filed Nov. 30, 2006, entitled "METHOD AND APPARATUS FOR OPTICAL FIBER COATING REMOVAL".

BACKGROUND OF THE INVENTION

1. Field of the Invention

The present invention relates generally to a method and apparatus for removing protective coating material from an optical fiber with a stream of hot gas. The hot gas softens the coating and blows it from the fiber.

2. Technical Background

Glass optical fibers have very small diameters and are susceptible to external influences such as mechanical stress and environmental conditions. To protect the fiber from such influences, it is provided with one or more coatings of protective material.

It is important that the stripped portions of the fibers do not become weakened during the stripping process since weakened fibers can fail during subsequent handling. Therefore, the coating stripping process should not inordinately reduce fiber strength.

Coating can be manually stripped from an optical fiber by placing the fiber within a hand-held tool, bringing blades of the tool into contact with opposite sides of the coating layer, and then moving the tool relative to the axis of the coated optical fiber. The bare portion of the fiber usually needs to be wiped with a cloth wetted with alcohol or the like to remove smudges and/or particles of coating that have been deposited on the bare portion of optical fiber by the coating removal process. This type of coating removal process has been built into equipment that performs the tasks of the technician, whereby the process is no longer manual.

Some coating removal processes employ a solvent such as acetone to soften and swell the coating so that it is more easily removed. Alternatively, a heater within the coating removal apparatus can also cause softening and swelling of the coating. Coating can also be removed by contacting the coated fiber with materials such as sulfuric acid and hydrogen peroxide (to remove a polyester coating) or with sulfuric acid (to dissolve a polysyloxine coating).

These processes have various disadvantages. Mechanical strippers can cause scoring or scratching of the fiber surface. For example, the fiber surface can be scratched as the bare glass fiber without its coating is removed from the mechanical stripping device. Some stripping methods do not result in a clean demarcation between the stripped coating and the coating remaining on the fiber. If the stripping process results in a ragged or uneven coating termination, the resultant stripped fiber may not be useful for its intended purpose. Mechanical stripping can also contaminate the fiber surface, thus requiring a subsequent cleaning step to remove particulates. The wiping step can cause more damage to the fiber than the mechanical stripping step. Mechanical stripping that is manually performed is highly operator dependent as it is typically performed with a hand held stripper.

Chemical stripping processes can be disadvantages in that they are difficult to control, and they may leave contaminants or residual coating on the fiber surface. Chemical stripping can also be disadvantages in that it utilizes dangerous caustic chemicals that need to be handled and disposed of. Moreover, chemicals can flow between the fiber and the coating that remains on the fiber just beyond the stripped region.

It is particularly difficult to remove the coating from an array of optical fibers such as a ribbon cable or a circularly symmetric multi-fiber cable since coating material is situated between closely spaced fibers or between fibers and filamentary strength members in such cables.

SUMMARY OF THE INVENTION

According to one aspect of the present invention a method for removing a protective coating material from a portion of an optical fiber that includes a glass optical fiber having an outer surface surrounded by the protective coating material comprises the steps of:
(i) providing a fiber collection and support device having: (a) a coarse conical fiber collector having an input port and (b) a fine fiber centering collector including a fiber tube having an output port, wherein the input port is larger then the output port; (ii) threading the fiber through the course conical fiber collector and providing into the fiber collection tube of the fine fiber centering collector; (iii) contacting the fiber, as it exits from the output port of the fiber collection tube; and (iv) directing a stream of a hot gas onto the protective coating material that is to be removed, the temperature and velocity of the hot gas being sufficiently high to soften and remove the protective coating material without damaging the outer surface of the optical glass fiber.

According to the preferred embodiments, the temperature of the hot gas is at least 400° C. Preferably, the temperature of the gas at the nozzle opening is 450° C. to 540° C. Preferably, the strip speed is below 20 mm/sec and more preferably below 15 mm/sec, for example between 8 and 15 mm/sec. Preferably, the gas is compressed air.

According to one aspect of the present invention, a fiber stripper system includes: (i) a fiber collection and support device having: (a) a coarse conical fiber collector having an input port with a diameter $D_a$ and (b) a fine fiber centering collector including a fiber tube having an output port with a diameter $D_b$ and length $L_b$, wherein said input port diameter $D_a$ is larger then said output port diameter $D_b$; and (ii) a gas heater with a nozzle; wherein nozzle centerline is situated about 2 mm from said output port, and said nozzle is preferably located no more than 0.3 mm away from the center of the fiber tube. Preferably the ratio $L_b/D_b$ is between 1 and 10.

Preferably, the gas heater creates an effective hot zone at least 0.5 mm deep and 0.5 mm wide. More preferably, this hot zone at least 1 mm deep and 1 mm wide.

It is an advantage of the present invention that it provides a clean, simple and inexpensive way for removing coating from a coated optical fiber. Another advantage is that the disclosed system is capable of supporting and guiding the optical fiber under the stream of hot gas directed onto that portion of the coating material which is to be removed.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

DETAILED DESCRIPTION OF THE PREFERRED EMBODIMENTS

Figure 1:
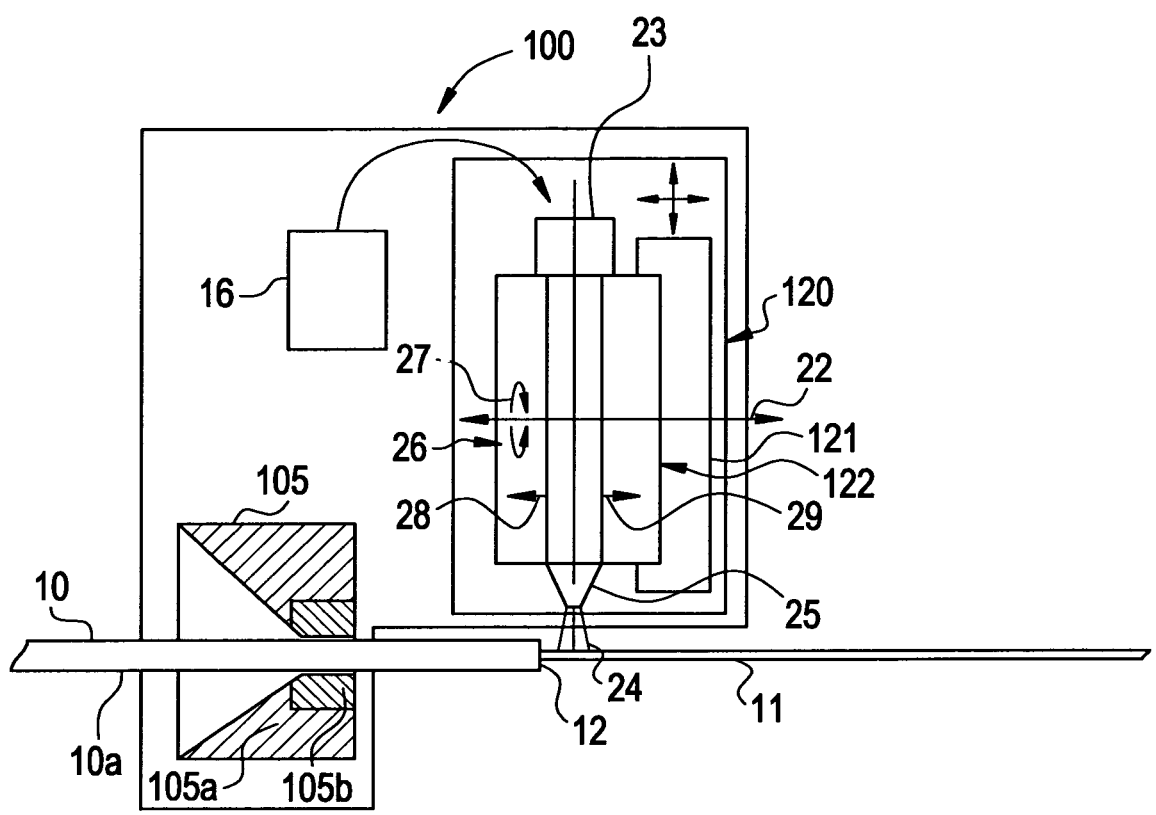
FIG. 1 is a schematic illustration of a system for removing coating material from a coated optical fiber.

Reference will now be made in detail to the present preferred embodiments of the invention, examples of which are illustrated in the accompanying drawings. Whenever possible, the same reference numerals will be used throughout the drawings to refer to the same or like parts.

FIG. 1 shows a fiber collection and stripping system 100 for removing coating material from coated optical fiber 10 which comprises glass optical fiber 11 and coating 12. The coating composition must be such that it rapidly softens as its temperature is raised. To determine whether a given coating material meets this requirement, a fiber coated with the given material is simply subjected to the method of this invention. Obviously, some coatings, which are formulated so that they are resistant to high temperatures, are unsuitable for use in the present method.

With reference to FIG. 1, the fiber collection and stripping system 100 includes a fiber collection and support device 105 and the hot gas stripper 120. The fiber collection and support device 105 and the hot gas stripper 120 may be constructed as a single unit, or may be separate devices situated adjacent to one another. A "free hanging" coated optical fiber 10, supported some distance away from its free end 10a, is presented to the fiber collection and support device 105. The fiber collection and support device 105 is constructed to accept the free end of the coated optical fiber 10 and to guide and support that end, as it passes under a hot gas stream 24 which softens and removes coating 12. The stripped glass fiber 11 may then be cleaved to produce a clean, perpendicular end face, for measurements, such as fiber cut-off wavelengths measurements, for example.

More specifically, in one embodiment, as shown in FIG. 1, the fiber collection and support device 105 comprises a coarse conical collector 105a and a fine fiber centering collector 105b. Preferably, the fiber collection and support device 105 is moved towards fiber 10 to collect the free end 10a of the coated optical fiber. The fine fiber centering collector 105b supports the free end 10a of the coated optical fiber 10 and provides it to a hot gas stream 24 generated by the heater apparatus 122 of the hot gas stripper 120. The heater apparatus 122 is positioned along axis 22 so that it rotates in a plane that includes point a along coated fiber 10, but its orientation about axis 22 is such that hot gas stream 24 is not directed at the fiber. After the heater apparatus 122 (e.g., tube heater) is turned on and the gas (air) temperature has increased to the operating point, the coating removal process can begin. The heater apparatus 122 is rotated about axis 22 in the direction of arrow 26 until the hot gas emanating from the nozzle 25 is directed at the coated fiber 10. After sufficient amount of coating material has been removed, the heater apparatus 122 can be rotated about axis 22 in the direction of arrow 27 so that hot gas is no longer directed at the fiber. The exposed glass optical fiber 11 is sufficiently clean that it can be tested, or used in processes such as coupler manufacturing or splicing without further treatment. The hot gas preferably does not dwell on one region of the fiber for too long a time since this could weaken the fiber. For this reason, in this embodiment, the fiber 10 preferably begins to traverse parallel to the axis 22 as soon as the heater apparatus 122 swings into the position where hot gas is directed onto the coated fiber 10. The stripping speed or speed with which relative motion occurs between the coated fiber 10 and the hot gas stream 24 depends upon parameters such as the gas temperature, the gas flow rate, the rate at which the gas stream traverses the coated fiber 10, and the softening characteristics of the particular coating material. These parameters are interdependent. If, for example, the temperature of the hot gas stream 24 were to increase from a first temperature to a second temperature, the relative motion between hot gas stream 24 and fiber 10 should increase from a first rate to a second rate to obtain a result similar to that obtained for the first temperature and first rate.

Gas is supplied from a gas source to the inlet pipe 23 of a hot gas stripper 120. The hot gas stream 24 provided by the nozzle 25 of the hot gas stripper 120 may be either air, or an inert gas. Examples of inert gasses are nitrogen, argon, helium, carbon dioxide and mixtures thereof. The nozzle 25 may have a relatively small diameter as shown in FIG. 1 to increase gas pressure, but other nozzle designs can be employed to confine the flow to predetermined cross-sectional geometries. For example, an elongated nozzle may direct an oblong cross-section flow onto a relatively long region of coated fiber. Preferably the temperature of the gas at the nozzle opening is at least 400° C. and more preferably the temperature is 450° C. to 540° C. In this embodiment, the heater apparatus 122 of the hot gas stripper 120 is mounted on a support apparatus 121 which is capable of rotating about axis 22 as indicated by arrows 26 and 27 and which is capable of moving along axis 22 as indicated by arrows 28 and 29, as well as up and down, perpendicular to the axis 22. Axis 22 may be parallel to the axis of coated fiber 10, but it need not be so oriented.

The method of this invention is not limited to those parameters which have been set forth in the embodiments described herein. There is a wide range of settings for gas flow rate, gas temperature, and relative movement between heater and optical fiber or fibers. For example, the coating has been removed from an optical fiber with reasonable effectiveness at gas temperatures as low as about 450° C. Thus, according to the following exemplary embodiments, a method for removing coating material from the glass optical fiber comprises the steps of: providing a guide tube having an open end; (ii)

feeding the glass optical fiber into and through the guide tube until a portion of the glass optical fiber and protective coating projects from the open end of the guide tube; and (iv) directing a stream of a heated gas onto the portion of the protective coating material projecting from the open end of the guide tube to be removed, the heated gas having a temperature and a composition, the temperature of the heated gas being sufficient to soften the protective coating material without melting the protective coating material. Preferably, the protective coating material is continuously removed from the glass optical fiber as the glass optical fiber is fed through and emerges from the open end of the guide tube. Preferably the step of directing the stream of heated gas onto the protective coating material further comprises the step of imparting a velocity to the stream of heated gas, the velocity being sufficient to blow the protective coating material softened by the heated gas off from the glass optical fiber. Preferably, the gas flow rate is between 8 SLPM (standard liters per minute) and 30 SLPM, more preferably between below 15 SLPM.

Thus, according to some of the embodiments of the present invention the fiber stripper system comprises: (i) a fiber collection and support device having: (a) a coarse conical fiber collector having an input port with a diameter $D_a$ and (b) a fine fiber centering collector including a fiber tube having an output port with a diameter $D_b$ and length $L_b$, wherein said input port is larger then said output port and the ratio of $L_b/D_b>1$, and preferably larger than 1.5; and (ii) a gas heater having a nozzle with a nozzle opening having a cross-sectional width Wn, for example 0.2 mm to 3 mm; wherein a nozzle centerline of the heater is situated preferably 1 mm to 5 mm from said output port, and said heater is preferably located no more than 10 mm away from the center of the a fiber tube. It is preferable that: (i) nozzle centerline is situated 1 mm-5 mm, and preferably about 2 mm from the output port, and (ii) the nozzle is located no more than 1 mm away from the center of the the fiber tube. Preferably the nozzle is located no more than 1 mm, more preferably no more than 0.5 mm, and more preferably no more than 0.3 mm away from the center of the fiber tube. It is preferable that the gas is provided by a heater having a nozzle with a nozzle exit opening having a cross-section of 0.04 to 0.09 inches (or about 1 to 2.5 mm). It is preferable that the gas heater creates an effective hot zone at least 0.5 mm deep (long) and 0.5 mm wide, more preferably at least 1 mm deep and 1 mm wide. Preferably, during stripping, the relative movement between fiber and nozzle is between 5 mm/sec and 30 mm/sec, more preferably between 8 mm/sec and 20 mm/sec, even more preferably between 8 mm/sec and 15 mm/sec. It is preferable that the distances from (i) the output port of the fine fiber centering collector to the center of the nozzle opening, and (ii) from the nozzle opening to the fiber are constant during striping.

The invention will be further clarified by the following examples.

EXAMPLE 1

Figure 2:
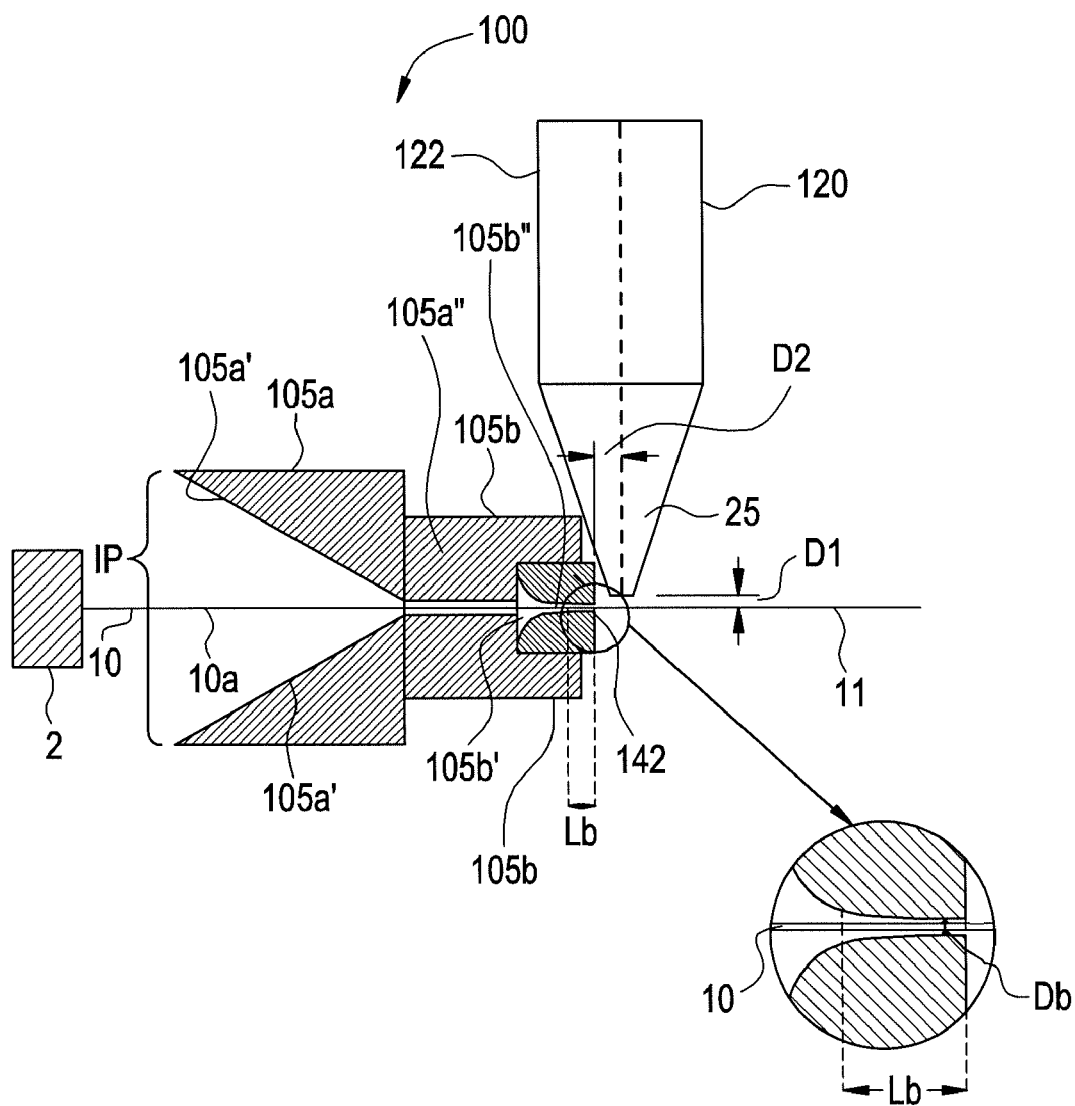
FIG. 2 is a schematic cross-sectional view of the fiber collection and stripping system corresponding to the first exemplary embodiment.

FIG. 2 illustrates one method for collecting a free end 10a of the coated optical fiber 10 and guiding and supporting the coated optical fiber 10; presenting it to the hot gas stripper 120 used in an automated coating removal system. In this embodiment the hot gas stripper 120 includes integral heater apparatus nozzle. The fiber collection and support device 105 for guiding and supporting the free end 10a of the fiber 10 is shown in cross-section for discussion purposes, and the fiber 10 is shown in its full extended position relative to the hot gas nozzle 25. The relative position of the fiber collection and support device 105 and the hot gas stripper 120 are maintained such that dimensions $D_1$ and $D_2$ are held constant. The coated fiber 10, the fiber guide collection and support device 105 and nozzle 25 (formed integrally with the heater of the hot gas stripper 120) may move independently of each other. The fiber collection and support device 105 comprises a coarse conical fiber collector 105a and a fine fiber centering collector 105b. The coarse conical fiber collector 105a includes an input port IP with the diameter $D_a$ and the course fiber tube 105a" with a diameter $D_a$". The fine fiber centering collector 105b which includes a fiber tube 105b" (also referred to as a fine centering fiber guide tube or a fiber collection tube) characterized by the length $L_b$ and its output port OP (fiber exit) diameter $D_b$, wherein the outer diameter $D_a$ of the input port diameter is larger then the output port diameter $D_b$.

Initially, collection of the free end 10a of fiber 10 is achieved with a conical fiber guide funnel 105a' of the course conical collector 105a. The outer diameter (OD) of the input port of the guide funnel 105a' exceeds the typical radial distribution of presented fiber ends 10a. This radial distribution of fiber end position can be influenced by length/weight of cantilevered coated fiber 10 and relative offset of the fiber support 2 from the center axis of the fiber collection and support device 105. Once collected and guided in the guide funnel 105a' and the course guide tube 105a" of the course conical collector 105a, the fiber end 10a passes through the fine fiber centering collector 105b, which in this embodiment includes a small collection cone 105b' and a fine guide tube 105b". The geometry specifications of the fine fiber centering collector 105b (also referred to as guide die herein) determine the variability of fiber position as it passes under the hot gas stream 24. The important aspects of the fine fiber centering collector 105b are output port diameter $D_b$ and the ratio of length $L_b$ to diameter $D_b$ of the fiber tube 105b" (straight wall land section of the fine fiber centering collector 105b). It is preferable that the diameter $D_b$ be at least 2 times larger and more preferable 3 to 16 times larger, and most preferably 5 to 10 times larger than that the outer diameter of the coated fiber 10. It is preferable that the $L_b/D_b$ ratio be at least 2, more preferably between 2 and 5, and most preferably about 3. This geometry defines the constraints of fiber exit angle a (not shown in FIG. 2). Also, the geometry can affect the robustness of design with regards to resistance to debris build-up in the fiber centering collector 105b over time, smooth fiber movement through the fiber centering collector 105b, and increased mean time between cleaning/replacement of the fiber centering collector 105b.

Figure 3:
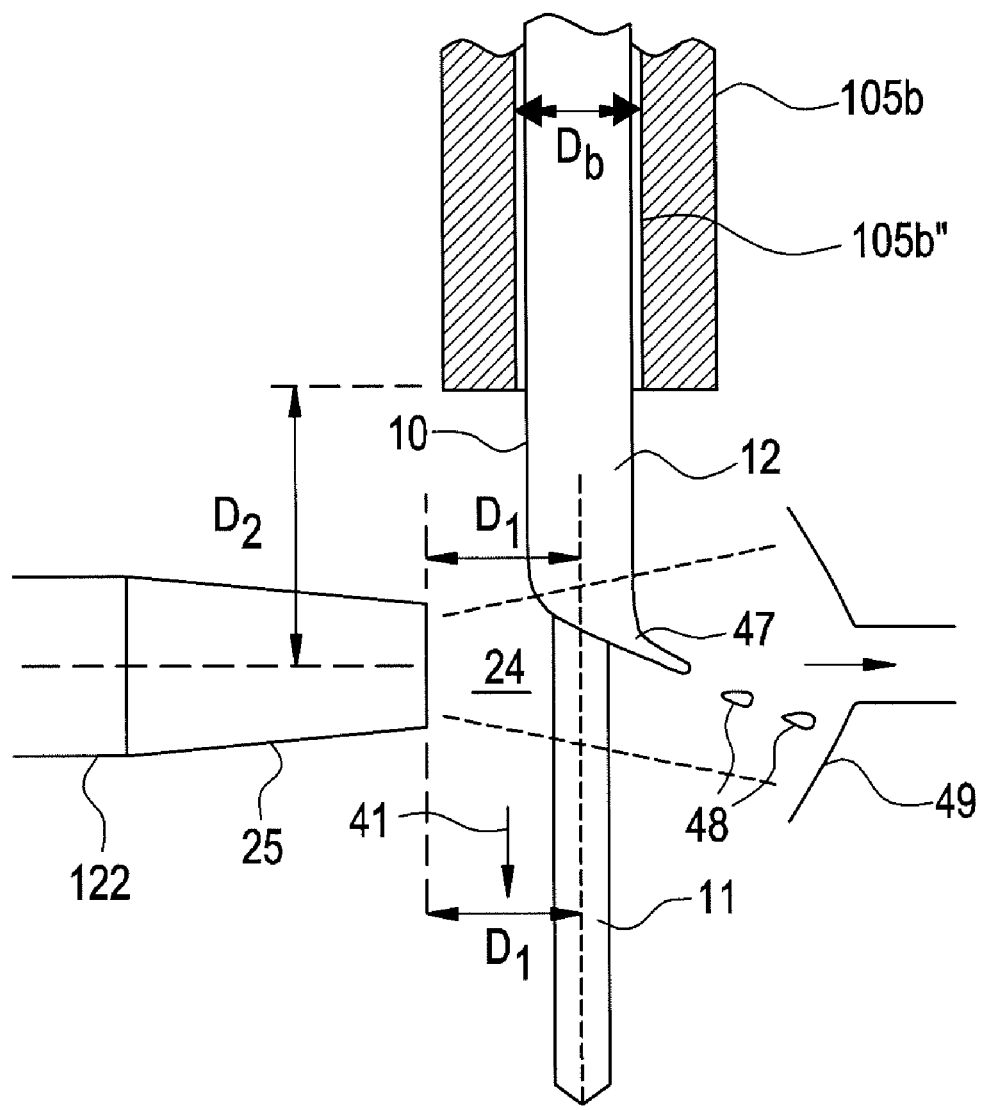
FIG. 3 is a schematic illustration of a fiber coating removal technique.

FIG. 3 illustrates schematically removal of coating 12 from the free end of a coated optical fiber 10. As shown by arrow 41 the coated fiber 10 is fed through the tube 105b" of the fine centering collector 105b. As described above, the inside diameter $D_b$ of the tube 105b" is larger than the outside diameter $D_{fiber}$ of the coated fiber. For example $D_b \approx 1.5 \times D_{fiber}$. The nozzle 25 of the heater apparatus 122 is located near the point of exit of the fiber from tube 105b", so as to minimize the amount of fiber vibration due to the gas stream 24 impinging on the optical fiber 10. The hot gas stream 24 can be directed either towards or away from fiber 10. During stripping, nozzle 25 is directed toward the axis of coated fiber 10. As the coated fiber 10 emerges from tube 105b", and into the path of hot gas stream 24, fiber coating 12 becomes softened by the hot gas, and small particles 48 of the coating material are blown from optical fiber 10 and into exhaust vent 49. A tail 47, which may remain after the stripping process, is sufficiently small that it does not interfere with subsequent processes in which the fiber is used. The stripped fiber 11 continues to move in direction 41 until sufficient amount of coating has been removed.

The heater apparatus 122 of this embodiment is a commercially available unit such as generated for heater voltage settings of approximately 75 volts RMS and an air gas flow rate of (8.5 SLPM). Nozzle 25 with exit diameter $W_n$ of 0.065 inches (1.65 mm) generates gas stream velocity of over 800 ft/sec. The diameter (width) and length (depth) of the hot gas stream's effective hot zone, were analyzed and are provided further down in the Specification. (See FIGS. 10-13). The dimensions of this hot zone determine the allowable fiber angle location error at a distance $D_2$ from the exit opening of the tube 105$b$", and the allowable distance $D_1$ of the fiber from the exit of the nozzle 25. In this exemplary embodiment $D_1$ is 1 mm and $D_2$ is 2 mm. As the fiber 10 exits fine fiber centering collector 105$b$ and passes through the effective hot zone at the exit opening of the nozzle 25, the coating 12 is removed and a clean fiber 11 results. After sufficient length of the fiber coating 12 is removed, the fiber can be retracted through the fiber collection and support device 105.

EXAMPLE 2

The fiber collection and stripping system 100 of this embodiment also utilizes a hot gas stripper 100 and fiber collection and support device 105. The hot gas stripper 100 is similar to the one illustrated in FIGS. 1 and 2. Preferably, the fiber collection and support device 105 is moved towards fiber 10 to collect the free end 10$a$ of the coated optical fiber.

Figure 4A:
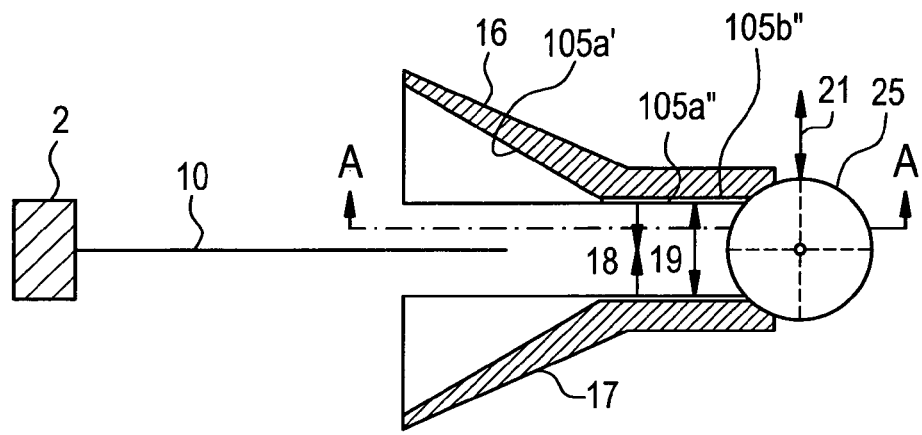
FIGS. 4a and 4b show schematic cross-sectional views of the fiber collection and stripping system corresponding to the second exemplary embodiment, and which utilizes a retractable collection and support device.
Figure 4B:
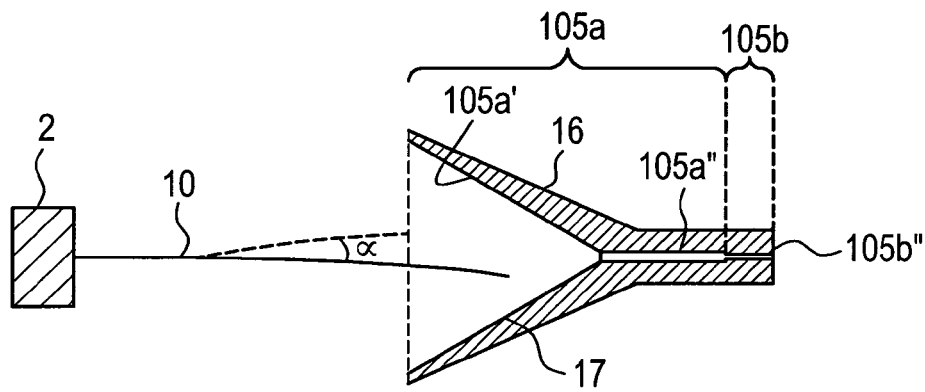

As in the previously described embodiment, the fiber collection and support device 105 (See FIG. 4$b$) for collecting, guiding, and supporting a free end of the coated optical fiber 10 during stripping includes a coarse conical collector 105$a$ and the fine fiber centering collector 105$b$. The coarse conical collector 105$a$ includes a guide funnel 105$a$' and a coarse guide tube 105$a$". The fine fiber centering collector 105$b$ includes a fine guide tube 105$b$". However, with reference to FIGS. 4$a$ and 4$b$ the fiber collection and support device 105 includes two mating sides 16 and 17 that are movable with respect to one another. The mating sides 16 and 17 are capable of separating by moving apart in direction 19, then closing in direction 18 to collect and support the coated fiber 10. The nozzle 25 can move in direction 21, towards and away from the optical fiber 10. Thus, the optical fiber 10, the mating sides 16 and 17 of the fiber collection and support device 105, and the hot gas stripper 120/heater apparatus 122 can move independently to effect the coating removal via the hot gas stream 24. After the coating 12 is removed, the hot gas heater 122 moves away from the fiber in direction 21 and then the mating sides 16 and 17 of fiber collection and support device 105 can disengage from the fiber in direction 19. The advantage of this approach is the clean stripped glass fiber 11 is not drawn back through the small opening of the fiber centering collector 105$b$, does not come in contact with the fiber collection and support device when retracted, thus advantageously eliminating or minimizing the opportunity for debris to settle on the glass fiber 11.

Illustration of another possible method of collection and guiding the fiber through the hot gas stream where the clean glass substrate does not come in contact with the guide support when retracted.

EXAMPLE 3

Figure 5:
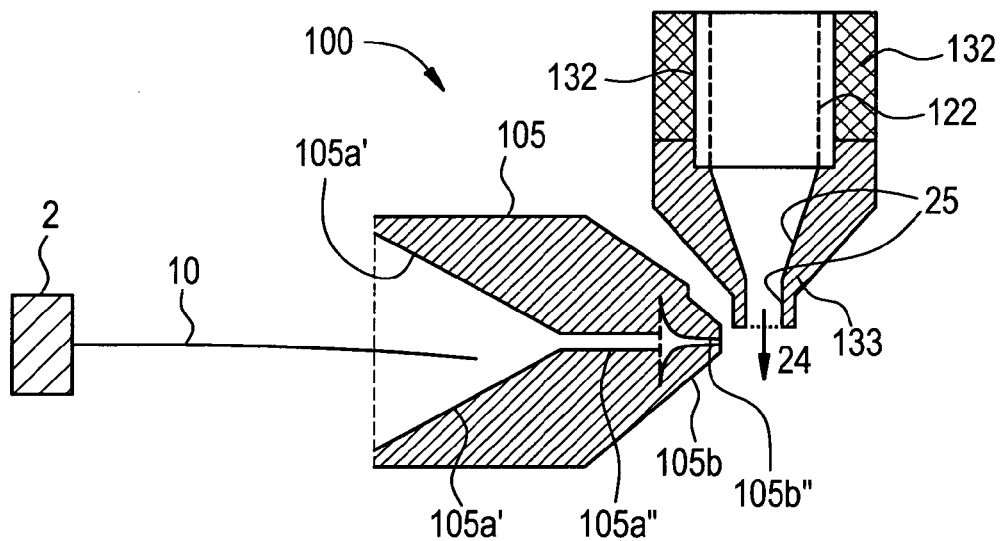
FIG. 5 is a schematic cross-sectional view of the fiber collection and stripping system corresponding to the third exemplary embodiment.

FIG. 5 illustrates a fiber collection and stripping system 100 similar to that shown in FIG. 2. It also maintains separation between fiber collection and support device 105 and hot gas stream nozzle 25, thus minimizing heat transfer to the fiber collection and the support device 105. Features such as conical fiber guide funnel 105$a$', coarse guide tube 105$a$" and fine fiber centering collector 105$b$ (support die) serve similar functions as described in example 2 illustrated in FIG. 2. In the present exemplary embodiment, the heater apparatus 122 is similar to that of Convectronics Models 001-10005 and 001-10007, but has an open end which serves as a nuzzle 25 (versus the integral nozzle shown in FIG. 2). This hot gas nozzle 25 is separate from the heater apparatus 122 and made of an insulating material 132 capable of handling a minimum temperature of 1600° F. The insulated heater 122 and nozzle 25 produce a larger effective hot gas stripping zone. Separation of the nozzle and heater assembly enables quicker heater replacement. A separate nozzle enables tighter nozzle dimensional tolerances over commercial heater nozzle and alternative insulating materials. To improve efficiency of the heater apparatus 122 and minimize the radial thermal gradient within the gas stream, insulation 132 suitable for a minimum of 1600° F. temperatures surrounded the entire heater apparatus 122. In this example, insulation 133 is also provided around the nozzle 25. Insulation of the heater apparatus 122 and nozzle 25 increased the size of the cross-sectional area of the effective fiber coating strip "hot zone" at the nozzle exit, as compared to an uninsulated heater apparatus/nozzle. The effect of this insulation, nozzle is described in detail further down in the Specification.

EXAMPLE 4

Figure 6:
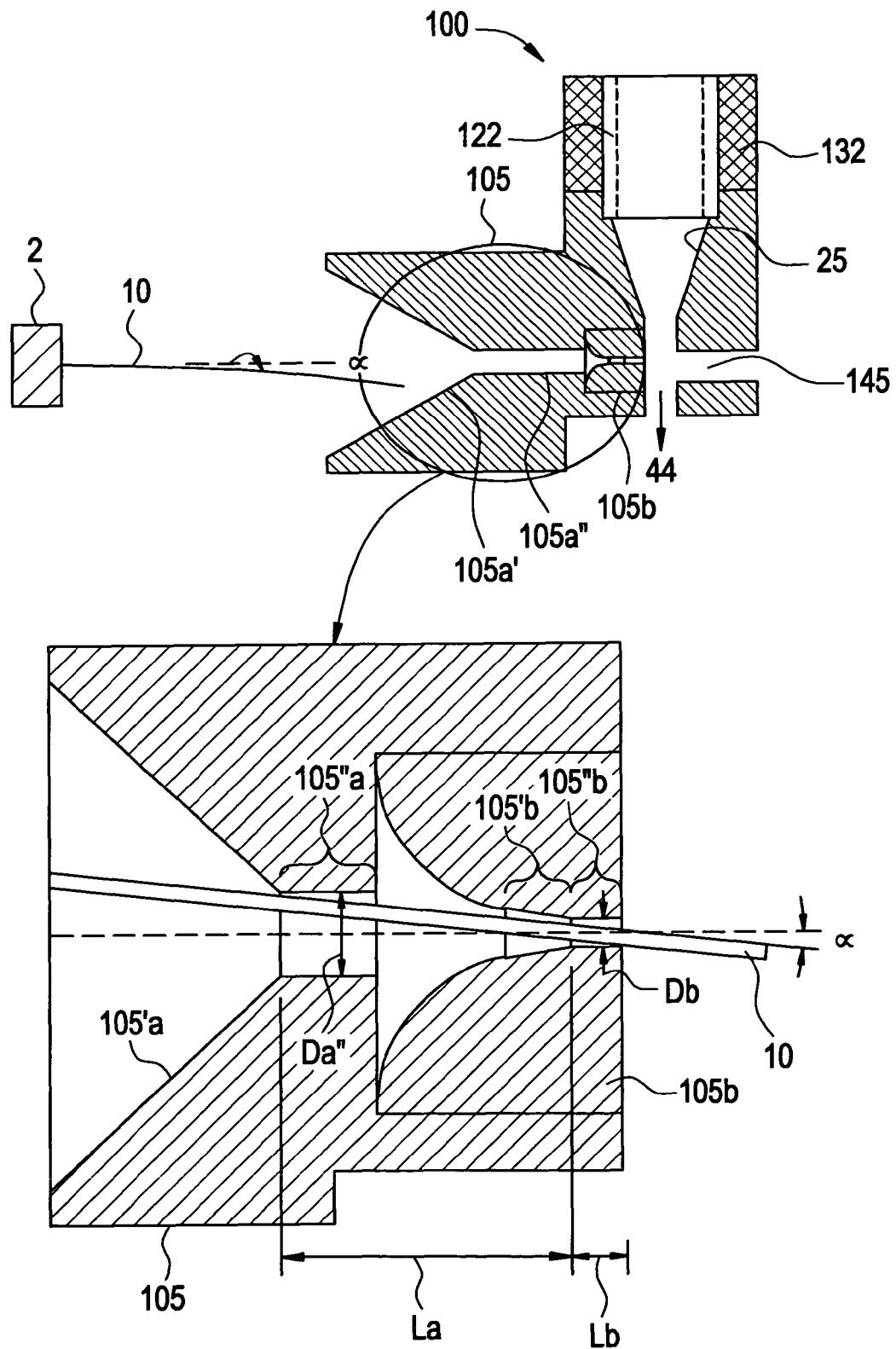
FIG. 6 is a schematic cross-sectional view of the fiber collection and stripping system corresponding to the fourth exemplary embodiment.

FIG. 6 illustrates another embodiment of the fiber collection and stripping system 100 which provides integration of the collection, guide, support and heater support functions and has the advantage of providing more accurate alignment of nozzle 25 with fiber centerline. This embodiment of collection and stripping system 100 enables placement of the hot gas stream centerline 44 closer to the output port (i.e. the exit aperture) of the fine fiber centering collector 105$b$. For a given amount of fiber presentation angle variability, as defined by geometry of the collection and stripping system 100, the actual offset from fine fiber centering collector 105$b$ centerline is reduced, because the hot gas stream centerline 44 is situated closer to the exit plane of the fine fiber centering collector 105$b$. In this exemplary embodiment the hot gas nozzle 25 is machined within collection and stripping system 100, forming a nozzle with a diameter that provides the desired hot gas velocity for effective coating removal. As in the previous embodiment, the heater and the nozzle are insulated. As the fiber 10 passes under the hot gas stream and the fiber's coating 12 is removed, the fiber moves through channel 145, which is provided to allow for the clean glass fiber 11 adequate clearance past the nozzle. Of course, it may also be desirable to eliminate the channel 145 and leave the exit path open.

EXAMPLE 5

Figure 7:
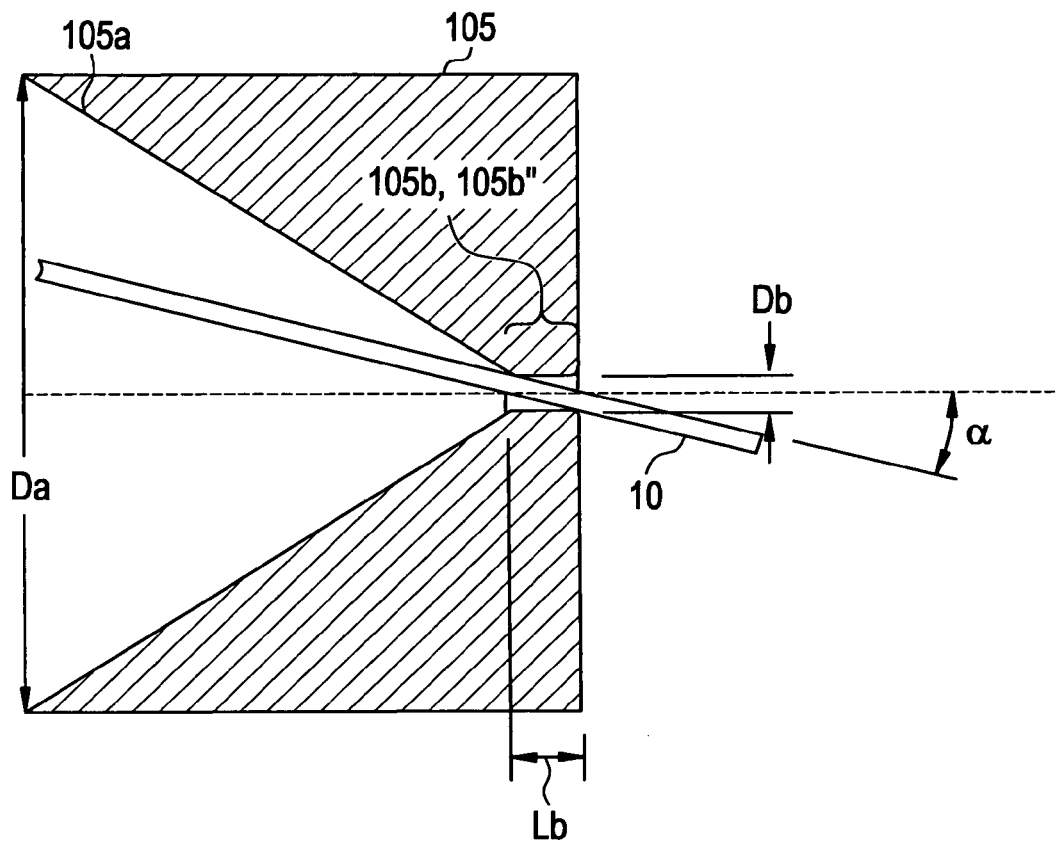
FIG. 7 is a schematic cross-sectional view of the fiber collection and stripping system corresponding to the fifth exemplary embodiment.

FIG. 7 illustrates another embodiment of fiber collection and support device 105. The fiber collection and support device 105 of this embodiment is similar to that shown in FIG. 1 and is simpler in construction than those shown in FIGS. 2-6. It includes the course conical collector 105$a$ with a conical fiber guide funnel 105$a$' and the fine fiber centering collector 105$b$, which includes a fine guide tube 105$b$". The diameter $D_a$ of the input port of the guide funnel 105a' exceeds the typical radial distribution of presented fiber ends 10a.

EXAMPLE 6

Figure 8:
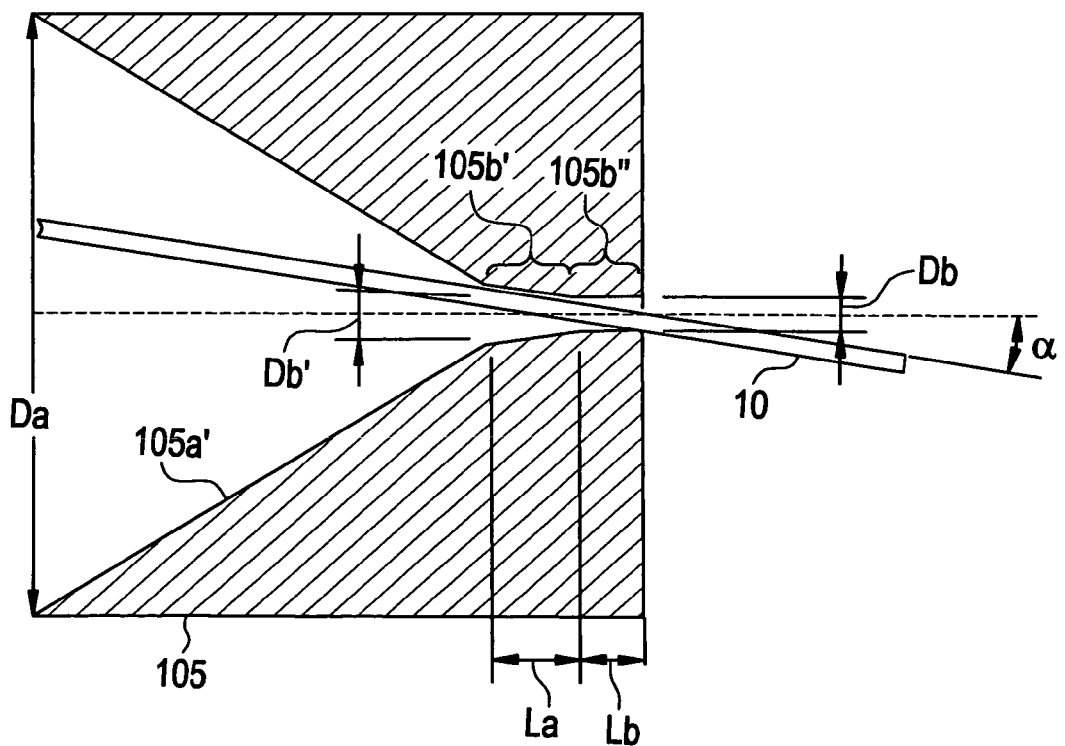
FIG. 8 is a schematic cross-sectional view of the fiber collection and stripping system corresponding to the sixth exemplary embodiment.

FIG. 8 illustrates another embodiment of fiber collection and support device 105. The fiber collection and support device 105 of this embodiment is also simpler in construction than those shown in FIGS. 2-5 and includes the course conical collector 105a and the fine fiber centering collector 105b. The course conical collector 105a comprises of a conical fiber guide funnel 105a' and the fine fiber centering collector 105b includes a small collection cone 105b' and a fine guide tube 105b".

Testing and Analysis

We had conducted testing of the effectiveness of the stripping system 100. The criteria for system's performance evaluation was cleanliness of the stripped fiber 11, as observed under a microscope and observation of the cleanliness of the fiber end as viewed by a PK glass geometry bench camera. The degree of success was rated by the level of debris observed on the glass fiber surface or glass fiber end, respectively and by the success of the glass geometry measurement. (The measurement bench compares the optimum form of a clean glass fiber to the actual glass under inspection. It then performs a calculation to determine if the glass is clean enough to continue the measurement.) The control variables were: the position of the coated optical fiber's axial centerline relative to the centerline of the hot gas nozzle, the distance of the coated fiber from the nozzle exit, as well as heater voltage, heater air flow rate, nozzle diameter, and rate of fiber movement (fiber speed) under the hot gas stream.

We also evaluated the effectiveness of the coating removal relative to fiber position variability. The experiment was designed to evaluate the level of coating removal with the fiber positions fixed at various X-Y positions within the hot gas stream 24.

Figure 9:
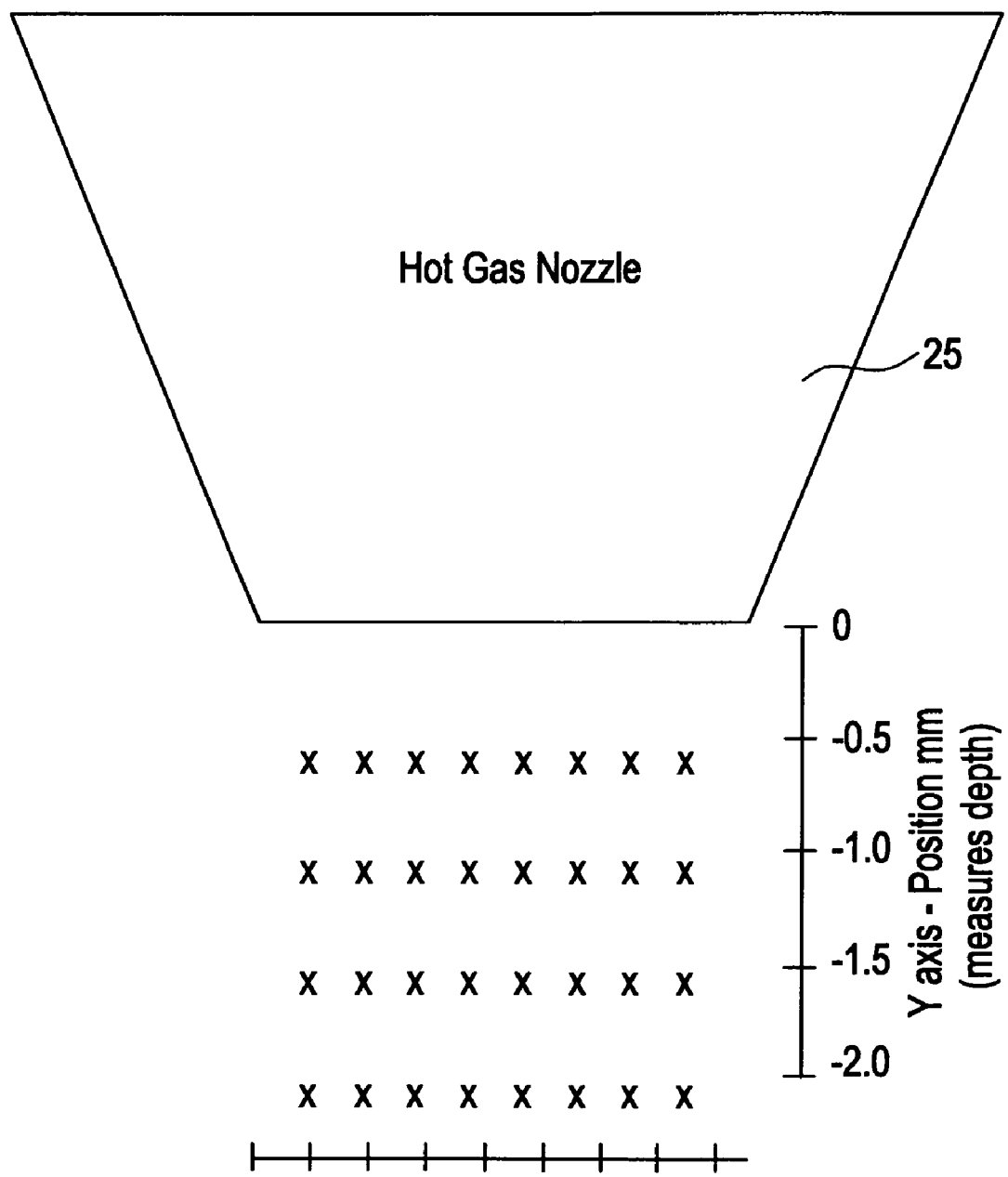
FIG. 9 shows the placement of fiber samples in the hot gas stream for the hot gas during mapping of effective hot zones.

FIG. 9 illustrates the positions of individual test fibers (each depicted as an "x" in this figure). The range of acceptable fiber positions along the X axis provided us with the acceptable diameters (or widths) of the effective hot zones, and the range of acceptable fiber positions along the Y axis provided us with the acceptable depth (length) of the effective hot zones. For this test, the guide support fixture was removed and the fiber was secured at both ends and positioned under the hot gas nozzle using a precision X-Y stage. Stripping velocities of 15 mm/sec, 12 mm/sec, and 10 mm/sec were tested for heater voltage setting of 75 volts and air flow rate of 8.5 SLPM. Once located in the hot gas stream at the appropriate test position, the fiber was moved axially at the specified velocity to remove a section of coating from the fiber. The cleaned section of each fiber was inspected under microscope to determine the qualitative cleanliness rating. The rating scale was from 0-5, where the rating of "0" means that no coating has been removed, and the rating of "5" corresponds to perfectly clean (no debris detected) fiber. FIGS. 10-13 illustrate the rating results in the form of 2-D contour plots. The areas corresponding to ratings of 4 and 5 are termed the "effective hot zone".

These results show how to achieve a large effective hot zone. A larger effective hot zone enables fiber support that maximizes ease of fiber collection and position accuracy (i.e., it requires less fiber position/insertion accuracy), and also allows guiding with minimal resistance and maximizes the mean time between device cleaning. For the test system shown in FIG. 1, the exit diameter $D_b$ of the fine guide tube 105b" was about 500 μm and the diameter coated optical fiber 10 was 245 μm. The overall fiber position variability was measured as 0+/−430 μm in the X and Y direction. The size of the hot zone and this variability in fiber positioning can effect whether or not the optical fiber is positioned within the effective hot zone.

Figure 10:
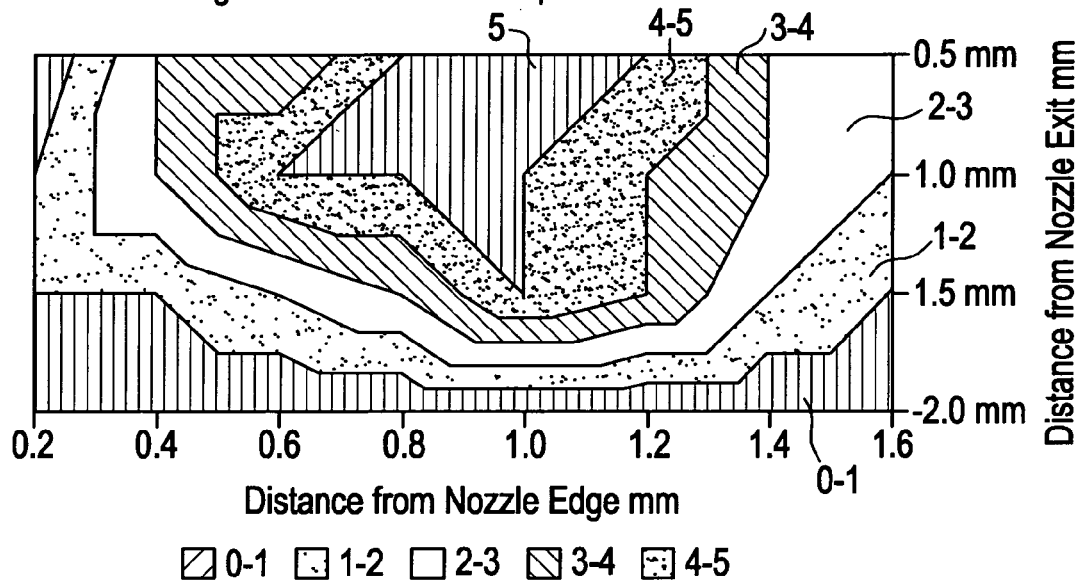
FIG. 10 illustrates the effective "hot zone" for acceptable fiber cleanliness produced by an uninsulated heater unit.
Figure 11:
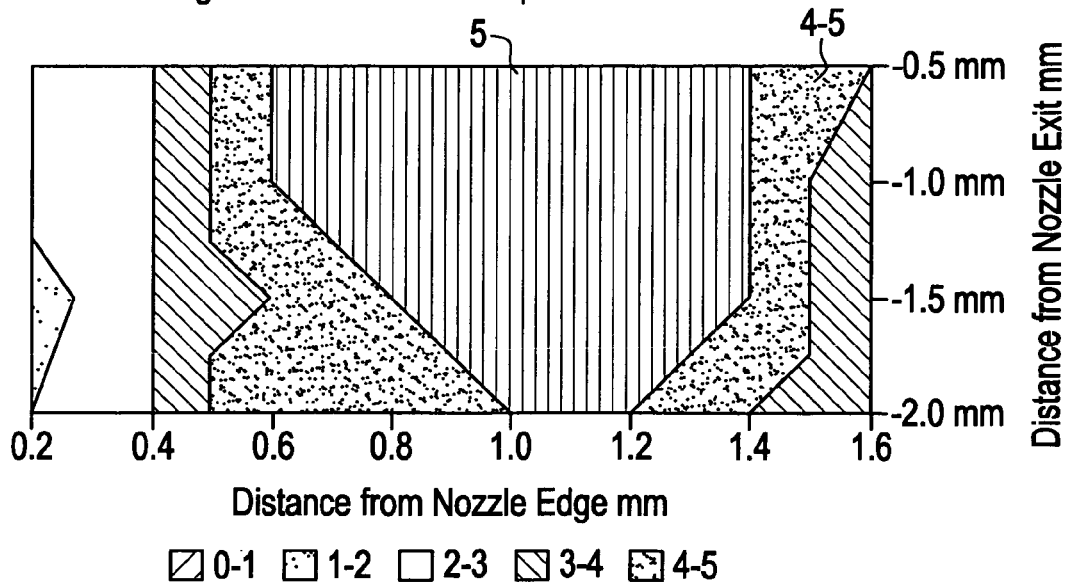
FIG. 11 illustrates the effective "hot zone" for acceptable fiber cleanliness produced by an insulated heater.

FIGS. 10 and 11 correspond to a strip speed (relative fiber speed with respect to the nozzle 25, while fiber coating 12 is being removed) of 15 mm/sec. The measurements illustrated in FIG. 10 resulted from utilizing an uninsulated Convectronics heater apparatus 122 with a model #001-10004 nozzle and with a model #002-10011 stainless sheath covering the straight-wall section of the heater apparatus 122. FIG. 10 illustrates that the effective hot zone for this set-up starts at about 0.5 mm from the nozzle opening (along Y axis, see FIG. 9). In the embodiment corresponding to FIG. 10, the effective hot zone that resulted in acceptable coating removal is relatively small. The hot zone is about 0.75 mm in length (−0.5 mm to −1.25 mm), and is about 0.5 mm wide (the hot zone extends, along the x axis, from 0.7 mm to 1.2 mm, relative to the nozzle edge). The preferred area of the effective hot zone corresponding to the rating of 5 is smaller. It is about 0.2 mm wide (0.8 mm to 1 mm from the nozzle's edge) and is 0.5 mm deep (−0.5 mm to −1 mm).

FIG. 11 illustrates the effect of insulating the length of the heater apparatus 122. It shows a larger effective hot zone than that shown in FIG. 10. The insulation minimized the radial temperature gradient within the hot gas, resulting in an increase in effective hot zone width to about 1.0 mm (the hot zone now extends from about 0.6 to about 1.4 mm, along the x axis), which is a 50% increase. Additionally, the effective hot zone extends from the nozzle (along y axis) from −0.5 mm to −2 mm, for a total of 1.5 mm. Overall, the effective "Hot Zone" area increased at least 250%-300%. The preferred area of the effective hot zone corresponding to the rating of 5 also increased relatively to that of FIG. 10 and is at least 0.6 mm wide (it now extends from about 0.8 to about 1.4 mm, along the x axis) and at least 1 mm deep (−0.5 mm to −1.5 mm). Accordingly, in this embodiment, accurate fiber positioning will be easier than that of the embodiment corresponding to FIG. 10. More specifically, the effective hot area shown in FIG. 11 is about 3 times longer and more than 2 times wider than that of the area represented by the fiber position variability described above. Thus, insulation of the heater apparatus 122 and nozzle 25 significantly increased the size of the cross-sectional area of the fiber coating strip effective hot zone, as compared to that of the uninsulated heater apparatus and nozzle. In this exemplary embodiment the diameter $D_b$ of the fine guide tube 105b" is 508 μm and coated fiber diameter is 245 μm. The maximum fiber deflection angle $\alpha$ is 14°, where angle $\alpha$ is formed by the fiber relative to the centerline of the fine guide tube 105b", and $L_b/D_b$ ratio is 2. The center line of the hot gas jet 24 (hot gas stream) exiting the nozzle 25 is located 2000 μm from the exit aperture of the fine guide tube 105b". The centerline of the fine guide tube 105b" is located 1000 μm below the exit plane of the nozzle 25.

Figure 12:
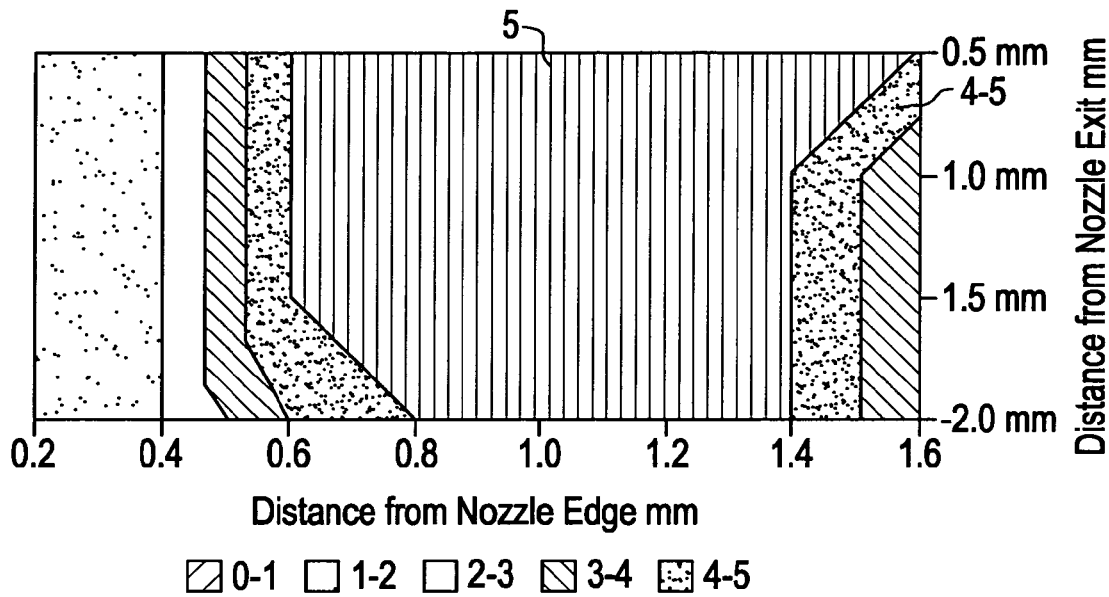
FIG. 12 illustrates the effective "hot zone" for acceptable fiber cleanliness produced by an insulated heater with a reduced strip speed to 12 mm/sec.
Figure 13:
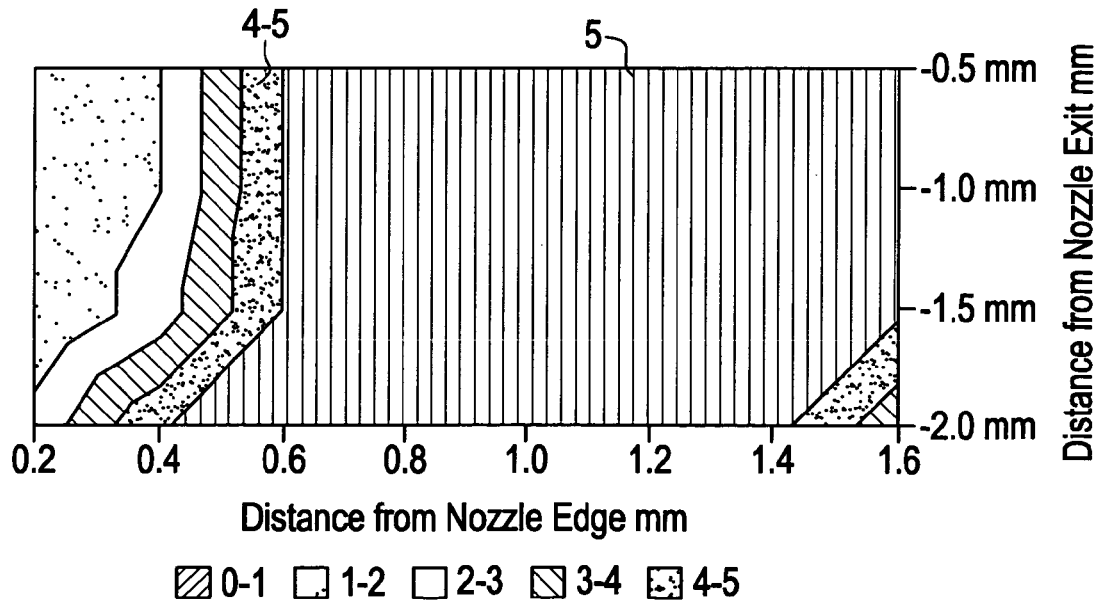
FIG. 13 illustrates the effective "hot zone" for acceptable fiber cleanliness produced by an insulated heater with a reduced strip speed to 10 mm/sec.

FIGS. 12-13 illustrate the results of test conditions where the heater apparatus 122 insulated as that corresponding to FIG. 11; however, the strip speed was reduced to 12 and 10 mm/sec respectively. The reduction in strip speed further increased the extent of the effective hot zone. For example, FIG. 12 illustrates that the effective hot zone is about 1.0 mm wide by 2.0 mm deep (from, −0.5 mm to −2 mm). Thus, reduction from 15 mm/sec to 12 mm/sec resulted in a 33% improvement in effective hot zone depth. The change in stripping speed from 15/sec to 10 mm/sec resulted in 20% increase of effective hot zone width (FIG. 13).

In absence of experimental determination of precise hot zone dimensions, one can assume that the effective hot zone diameter (or width/length) is about ½ of the diameter (or width/length) of the nozzle opening, when the hot gas temperature at the nozzle opening is at least 500° C. The dimensions of the effective hot zone determine the maximum preferred deflection angles for the fibers exiting the fine guide tube 105b", which in turn determines the required $L_b/D_b$ ratio. This ratio can be calculated from the following equation:

$$\frac{L_b}{D_b} = \left[\frac{1 - \left(\frac{1}{D_b}\right)\left(\frac{D_{fiber}}{\cos(\alpha)}\right)}{\tan(\alpha)}\right]$$

$D_b$=um, diameter of guide die land region
$D_{fiber}$=um, coated fiber diameter
$L_b/D_b$=Ratio of length to diameter of guide die land region
α=degrees, angle formed by fiber relative to guide die land centerline Table I, below, provides exemplary preferred dimensions for various parameters for the collection and stripping system 100.

TABLE I

| | Preferred range | More preferable range |
|---|---|---|
| $D_2$ | 3 × $D_{fiber}$ to 16 × $D_{fiber}$ | 6 × $D_{fiber}$ To 10 × $D_{fiber}$ |
| $D_{ehz}$ | 3 × $D_{fiber}$ to 12 × $D_{fiber}$ | 4 × $D_{fiber}$ To 8 × $D_{fiber}$ |
| $H_{ehz}$ | 4 × $D_{fiber}$ to 16 × $D_{fiber}$ | 8 × $D_{fiber}$ To 16 × $D_{fiber}$ |
| $D_1$ | 2 × $D_{fiber}$ to 6 × $D_{fiber}$ | 3 × $D_{fiber}$ to 5 × $D_{fiber}$ |
| $D_b$ | 1.5 × $D_{fiber}$ to 4 × $D_{fiber}$ | 2 × $D_{fiber}$ to 3 × $D_{fiber}$ |
| $L_b/D_b$ | 1 to 10 | 2 to 4 |
| $L_{conical}$ | 0 to 4 to 12 × $D_{fiber}$ | 4 × $D_{fiber}$ to 8 × $D_{fiber}$ |
| $D_{conical}$ | 1.25 × $D_b$ to 5 × $D_b$ | 1.4 × $D_b$ to 2.1 × $D_b$ |
| $L_a$ | 0 to 10 × $D_b$ | 2 × $D_b$ to 4 × $D_b$ |
| $D_a"$ | 1.25 × $D_b$ to 5 × $D_b$ | 2 × $D_b$ to 3 × $D_b$ |
| α | 0 to 25 degrees | 0 to 20 degrees |
| β | 0 to 25 degrees | 0 to 20 degrees |

Where: $D_{fiber}$ is the diameter of the coated optical fiber 10, $D_a"$ is the inside diameter of the coarse fiber tube 105a", $L_a$ is the distance between the entrance to the coarse fiber tube 105a" and the entrance to the fine centering fiber guide tube 105b", $D_2$ is the distance between exit plane of fine fiber centering collector 105b and hot gas stream centerline; $D_{ehz}$ is the diameter or width of "effective hot zone" of gas exiting the hot gas stream nozzle 25; $H_{ehz}$ is the depth (length) of the "effective hot zone" of gas provided by the hot gas stream nozzle 25 and measured from the exit plane of the hot gas stream nozzle 25; $D_1$ is the distance from exit plane of hot gas stream nozzle to centerline elevation of the fine fiber centering collector 105b; angle α is the angle formed between the edge of fine fiber centering collector 105b orifice inside diameter and the outer edge of the "effective Hot Zone" of the hot gas stream at a distance $D_2$ from the exit plane of the fine fiber centering collector 105b; and angle β is the angle formed between the bottom edge of the fine fiber centering collector 105b orifice inside diameter and the centerline of the "effective Hot Zone" provided by the hot gas stream at a distance $L_{ehz}$ from the exit plane of the hot gas stream nozzle 25.

It will be apparent to those skilled in the art that variations and modifications can be made to the present invention without departing from the scope of the invention. For example, although step index structures are show, other graded index structures may be employed. Moreover a ring structure may be added to the fiber profile as well and would still function acceptably. Thus, it is intended that the present invention cover the modifications and variations of this invention provided they come within the scope of the appended claims and their equivalents.

What is claimed is:

1. A method for removing a protective coating material from a portion of an optical fiber, said optical fiber including a glass optical fiber having an outer surface surrounded by said protective coating material, said method comprising the steps of:
   (i) providing a fiber collection and support device having:
      (A) a coarse conical fiber collector having an input port, the input port has a diameter Da that exceeds typical radial distribution of fiber presented to the fiber collection and support device, and
      (B) a fine fiber centering collector including an input opening adjacent to said coarse conical fiber collector and a fiber collection tube having an output port such that (a) said input opening of said fine fiber centering collector is smaller than the input port of coarse conical fiber collector and is larger then said output port, (b) said input port of said coarse conical fiber collector larger then said output port, (c) and the output port has a diameter $D_b$ that is at least 1.5 times larger than the outside diameter of the coated fiber, and $D_b$<Da, and (d) the ratio $L_b/D_b$ is between 1 and 10, where $L_b$ is the length of the fiber collection tube $D_b$ is output port;
   (ii) threading the fiber through the coarse conical fiber collector and into the fiber collection tube of the fine fiber centering collector via said input opening of said fine fiber centering collector;
   (iii) contacting the fiber, as it exits from the output port of the fiber collection tube, with a stream of hot gas; and
   (iv) directing a stream of hot gas onto the protective coating material that is to be removed, the temperature and velocity of said hot gas being sufficiently high to soften and remove the protective coating material without damaging the outer surface of the optical glass fiber.

2. The method of claim 1 including the step of moving said fiber collection and support device towards the optical fiber to collect the fiber.

3. The method of claim 1 wherein said gas is provided by a nozzle having an opening and (i) the temperature of said gas at the nozzle opening is at least 400° C.; (ii) gas flow rate is below 30 SLPM; and said method including the step of providing relative movement between the stream of the hot gas and the optical fiber, said relative movement being at a speed between 8 mm/sec and 15 mm/sec.

4. The method of claim 1 wherein said gas is provided by a nozzle having an opening, and the temperature of the gas at the nozzle opening is 450° to 540° C.

5. The method of claim 1 wherein said gas is compressed air.

6. The method of claim 1 wherein said gas is provided by a heater having a nozzle with a nozzle opening, and the distances from (i) said output port to the center of said nozzle opening, and (ii) from the nozzle opening to the fiber are constant during coating removal.

7. The method of claim 1 wherein said gas is provided by a heater having a nozzle with a nozzle opening having a cross-section of 1 to 2.5 mm.

8. The method of claim 1, the method further comprises the step of providing relative movement between the stream of hot inert gas and the fiber optic cable.

9. The method of claim 1, wherein said coarse conical collector of said fiber collection and support device includes two sides movable toward and away from one another.

10. A fiber stripper system comprising:

(i) fiber collection and support device having: (a) a coarse conical fiber collector having an input port with a diameter $D_a$ and (b) a fine fiber centering collector including a conical collector with an input opening that has a diameter that is smaller than the diameter of said input port of the coarse conical fiber collector, and fiber tube having an output port with a diameter $D_b$ and length $L_b$, wherein said input port diameter $D_a$ is larger then said output port diameter $D_b$ and is larger than 1.5 times the coated fiber diameter, and (ii) a gas heater having a nozzle with a nozzle; wherein nozzle centerline is situated about 2 mm from said output port, and nozzle is located no more than 1 mm away from the center of the a fiber tube.

11. The fiber stripper system according to claim 10 wherein said gas heater creates an effective hot zone at least 0.5 mm deep and 0.5 mm wide.

12. The fiber stripper system according to claim 10 wherein said gas heater creates an effective hot zone at least 1 mm deep and 1 mm wide.

13. The fiber stripper system according to claim 10 wherein said coarse conical collector of the fiber collection and support device includes two sides movable toward and away from one another.

* * * * *